Figure 5:
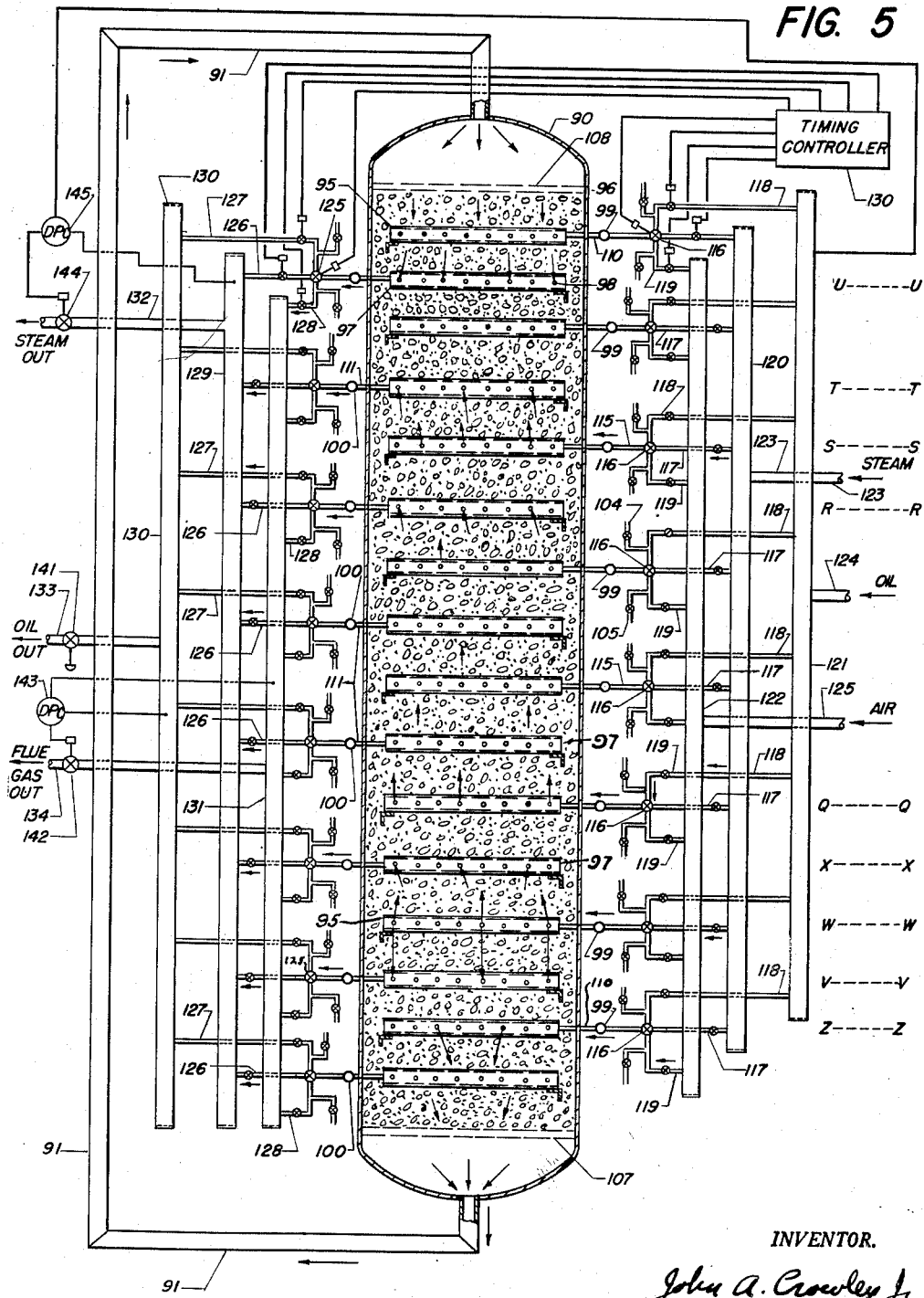

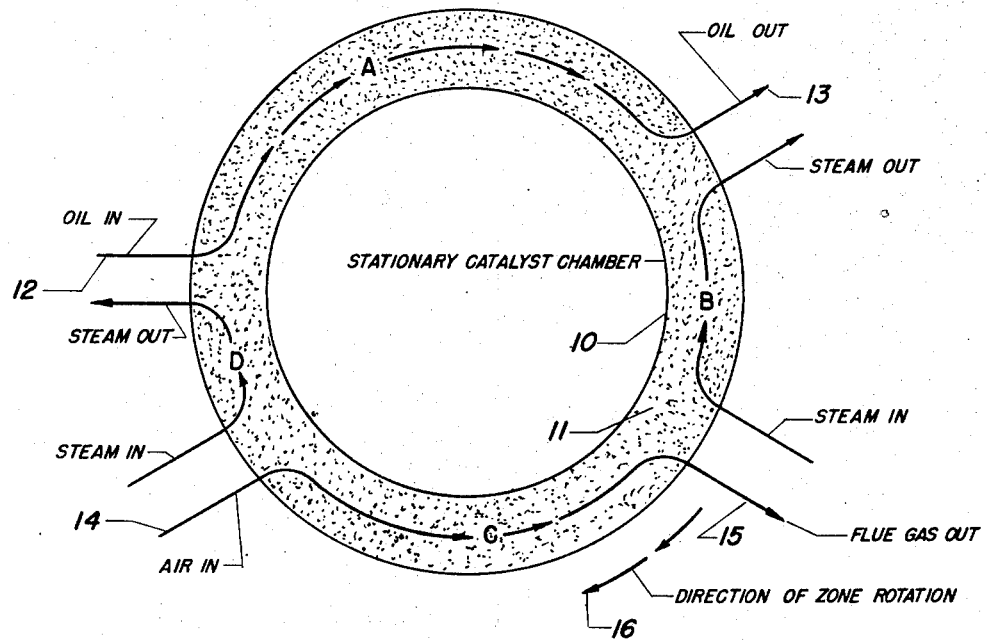

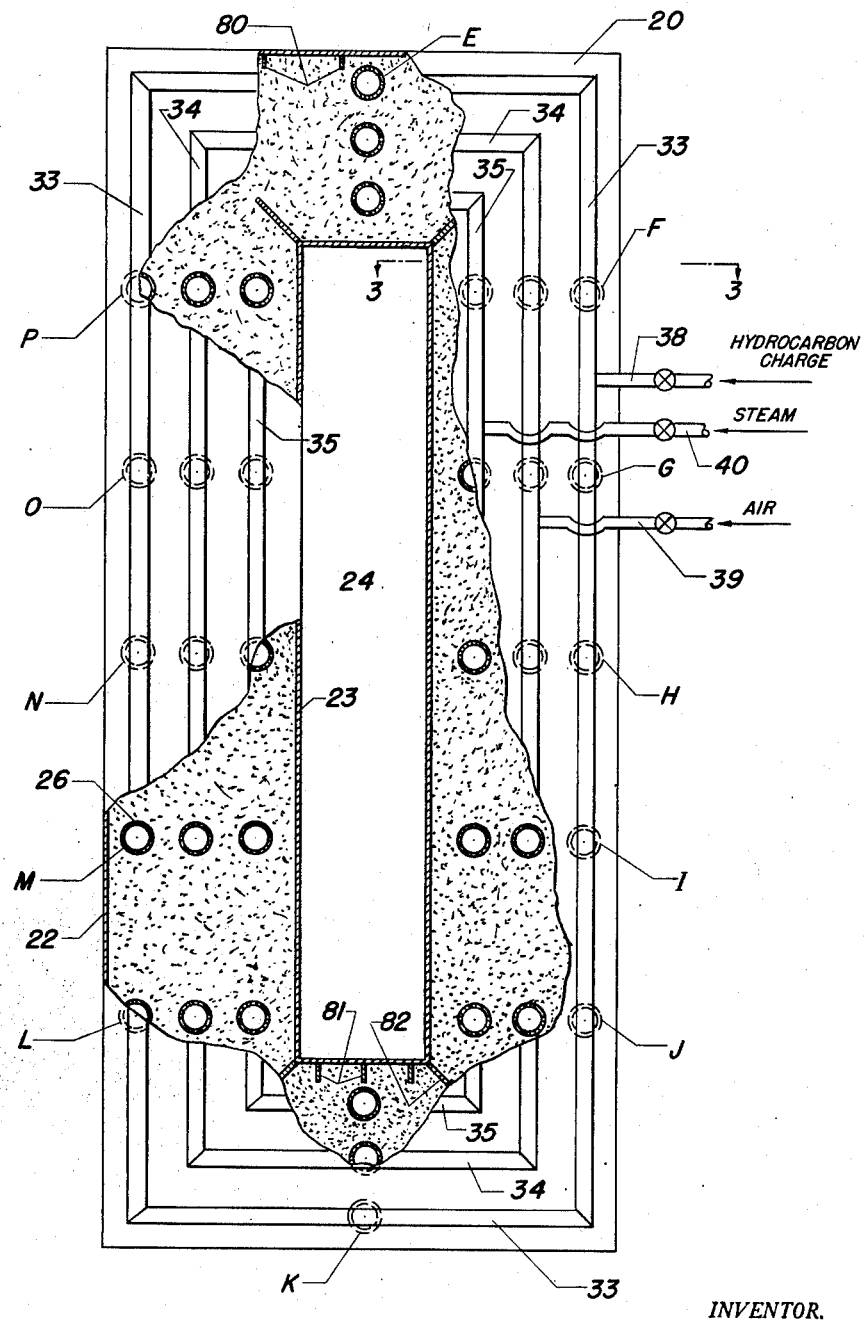

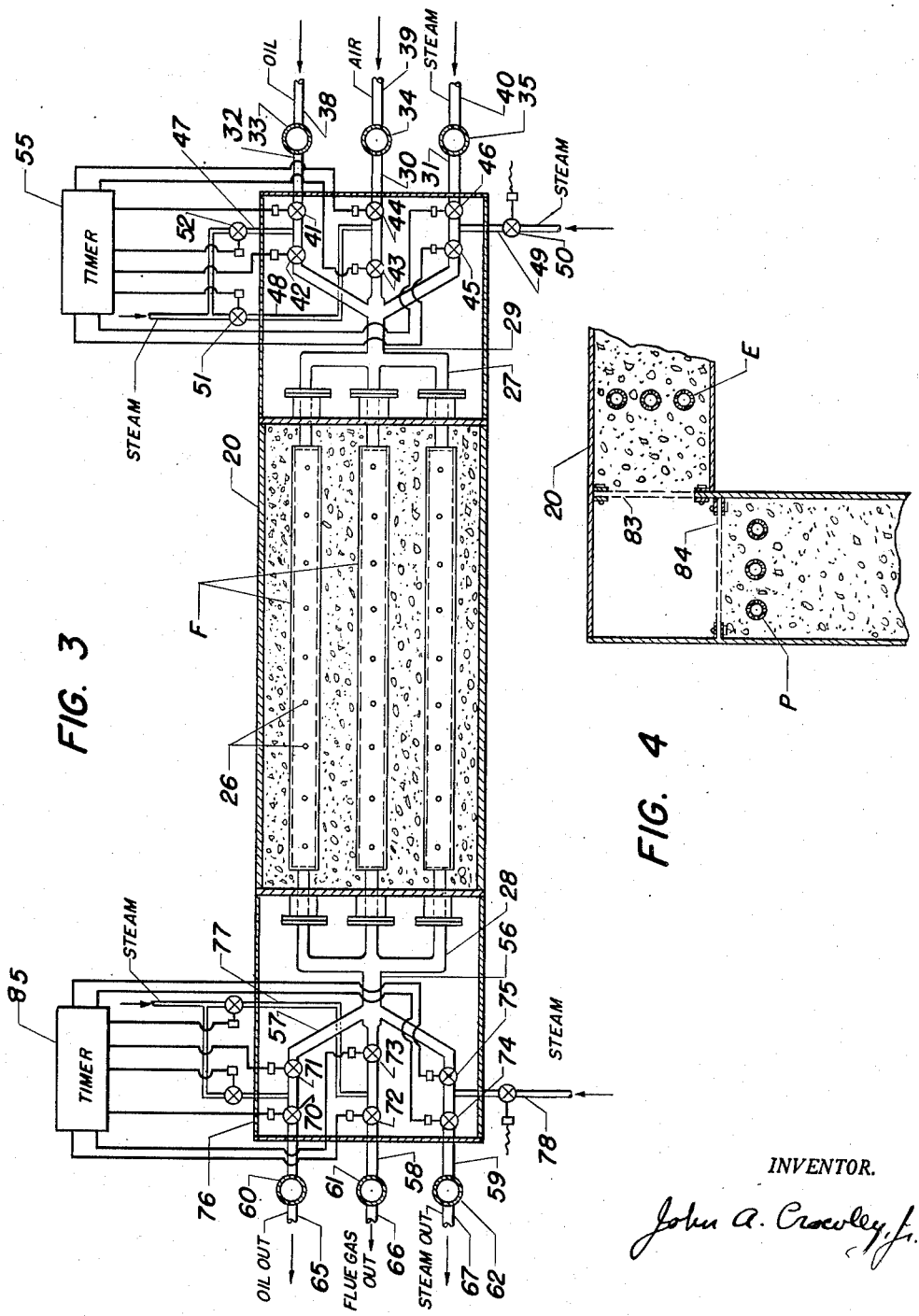

April 21, 1953   J. A. CROWLEY, JR   2,635,988
HYDROCARBON CONVERSION PROCESS

Filed Feb. 11, 1949   4 Sheets-Sheet 4

INVENTOR.
John A. Crowley Jr.

Patented Apr. 21, 1953

2,635,988

UNITED STATES PATENT OFFICE 2,635,988

HYDROCARBON CONVERSION PROCESS

John A. Crowley, Jr., Scarsdale, N. Y., assignor to Socony-Vacuum Oil Company, Incorporated, a corporation of New York Application February 11, 1949, Serial No. 75,765

10 Claims. (Cl. 196—52)

This invention relates to the field of conversion of hydrocarbons in the presence of solid contact materials. It is specifically concerned with a continuous process for conversion of hydrocarbons in the presence of a fixed mass of particle form solid contact material. Typical of reactions for which this process may be employed are the catalytic cracking conversion of high boiling hydrocarbons to lower boiling gasiform products, catalytic reforming, dehydrogenation, hydrogenation aromatization, desulfurizing, etc. of hydrocarbon fractions. Also typical is the pyrolytic conversion of hydrocarbons in the presence of heated inert solid contact materials.

The contact material may consist of an adsorbent catalyst or an inert refractory material depending upon the particular reaction involved. Typical catalysts take the form of natural or treated clays, bauxites, activated alumina containing certain metallic oxides and synthetic associations of silica, alumina or silica and alumina, to which may be added certain metallic oxides for special purposes. The size of the contact material particles may range from about 100 mesh Tyler up to particles of the order of one-half inch diameter. Usually, particles of the order of one-quarter inch up to about 30 mesh size are preferred.

Heretofore, hydrocarbon conversions have been conducted commercially in two principal types of systems. In one system the solid contact material is maintained "in situ" in a confined zone and a hydrocarbon charge is passed through the zone until the catalyst has become deactivated due to coke deposition thereon. Thereupon, the oil charge is by-passed from the reactor and air is blown through the catalyst mass to accomplish its regeneration by combustion of the coke deposits. This process has the disadvantage of not being continuous, thereby giving rise to serious fluctuations in the recovery plant operation. Also since the catalyst gradually falls off in activity during the course of the "on stream" period, the product yield and the product quality is not constant. These fluctuations are to some extent "ironed-out" insofar as the product recovery system is concerned by operation of six to eight reactors together in such a manner that some reactors are on the regeneration cycle while others are on the cracking cycle. This procedure fails entirely, however, to overcome the nonuniformity in conversion of the oil charge because of the fact that the oil charged to any reactor during the later stages of the "on-stream" period is subjected only to partially spent catalyst while the oil charged during the earlier part of the "on-stream" period is subjected only to fresh catalyst and at a relatively higher temperature.

Another type of system currently employed for hydrocarbon conversions are the continuous moving catalyst systems in which catalyst either as a powder or in granular form is passed cyclically through separate reaction and regeneration zones. Such systems overcome many of the disadvantages of the "fixed bed" systems but give rise to the new disadvantage of catalyst movement. Continuous catalyst movement causes erosion of the equipment and attrition of the catalyst particles and loss of the finely divided catalyst from the system as dust in the effluent gas streams. Also, such systems involve serious problems in catalyst introduction into zones operating under pressure and usually require great overall unit elevations.

It is a major object of this invention to provide a new process for conducting conversion of hydrocarbons in the presence of a solid contact mass material which overcomes the above mentioned disadvantages of the currently employed hydrocarbon conversion systems.

A specific object of this invention is the provision of a continuous process for converting hydrocarbons in the presence of a fixed mass of particle form contact material.

These and other objects of this invention will become apparent from the following description thereof.

The process of this invention takes the form of one in which there is maintained a closed, confined circuit wherein gas may flow along at least part of the length of which and preferably along most or all of which a compact column or mass of particle form contact material is provided. A reaction region of hydrocarbon flow through the contact material is maintained along a portion of the column and a region of regeneration gas flow is maintained along another portion of the column separated from the reaction region by a region of higher pressure inert purge gas flow. The reaction region is caused to move cyclically around the closed circuit by effecting cyclic movement around said circuit of the locations of gas supply to and withdrawal from said region. The regeneration region is similarly caused to move cyclically around the closed circuit after the reaction region so as to effect removal by burning of the coke deposited on the contact material by the hydrocarbon conversion. The movement of the reaction region is such that at any given instant the catalyst in that region has been subjected without intervening regeneration to hydrocarbon flow for progressively shorter periods of time in the direction of region movement. The same is true of the region of regeneration gas flow.

Turning now to the drawings for a detailed study of the invention, Figure 1 is a highly schematic drawing illustrating the operation flow plan according to this invention; Figure 2 is an elevational view, partially in section, of an arrangement adapted for conducting the invention; Figure 3 is a cross-sectional view taken along line 3—3 in Figure 2; Figure 4 is an elevational view, in section, showing a modification of a portion of the apparatus shown in Figure 2; and Figure 5 is an elevational view, partially in section, of a modified form of the invention. All of these drawings are highly diagrammatic in form.

Turning now to Figure 1, there is shown a highly diagrammatic flow scheme of the method of this invention. A stationary chamber is represented by numeral 10. This chamber is filled with a compact mass of particle form contact material 11, which is also maintained stationary. The chamber forms a closed circuit in which gas may flow and the contact material forms an endless compact column. A suitable oil charge is introduced into the column at one point 12 along its length and withdrawn at a second point 13 spaced from the point of introduction so that a region A of oil flow through a portion of the column length is provided. Similarly, air is introduced into the column at 14 and withdrawn at 15 to provide a region of air flow C through a different portion of the column. It will be noted that region C is spaced apart on both ends from region A and that between regions A and B there is maintained regions B and D wherein an inert gas such as steam or flue gas flows to purge the contact material and to prevent interflow of reactant gases between regions A and C. By causing the point of oil introduction 12 and oil withdrawal 13 to rotate around the column in the direction indicated by arrows 16 while maintaining the distance between 12 and 13 constant there is effected a cyclic movement of the region or zone of oil flow around the closed circuit formed by chamber 10. The region of air flow C is similarly caused to cyclically move around the chamber 10 so as to follow the region A and remove by burning the coke deposited during the conversion of the oil charge. Likewise, regions B and D are rotated in their proper order. In region D, the contact material is purged to remove vaporous hydrocarbons therefrom before region C reaches the contact material. In region B the contact material is purged to remove oxygen containing gas prior to the arrival of region A. It is possible by control of the rate of movement of the reaction and regeneration zones around the closed circuit to provide a heat balanced operation. By circulation of the zones A and C at a sufficiently high rate, it is possible to limit the contaminant deposit on the catalyst to an amount which can be removed by burning without overheating of the contact material to a heat damaging level even though no heat is removed by an external heat exchange fluid. The regeneration temperature can be controlled to an appreciable extent by use of an excess of cold air or by recycling of flue gas. The difference in the heat liberated in regeneration region C and the heat removed therefrom by the regeneration gas stream is the excess heat of regeneration and is stored up in the catalyst and later used for the hydrocarbon reaction. For example, the catalyst may be heated from 800° F. to 1050° F. as the region C passes therethrough and later it is cooled back to 800° F. as the region A passes. The difference between the total heat requirement needed for the endothermic hydrocarbon conversion in region A and the heat supplied into region A as preheat in the oil charge stream is the excess heat requirement in the conversion zone. By proper adjustment of the rate of region rotation around chamber 10, the excess heat of regeneration can be made to balance the excess heat of hydrocarbon conversion. In general, when the overall temperature of the system is dropping off, i. e., the excess heat of conversion is greater than the excess heat of reaction, the necessary adjustment is an increase in the rate of rotation of regions A and B around chamber 10. The reverse adjustment is required when the overall temperature of the system is falling off. However, in any case the rate of region rotation must be sufficiently high to permit removal of the contaminant deposit by burning in the regeneration region without the contact material reaching a heat damaging level during the passage of the regeneration region. Additional flexibility of operation is available in that the inlet reactant and regeneration and purge gas streams to the respective regions may be controlled in rate and in temperature as a further means of adjustment and control over the overall system temperature level. For proper operation, these variables should be controlled so as to provide (1) a constant level of overall system temperature, i. e., constant average reaction zone temperature and constant average regeneration zone temperature; (2) substantially complete catalyst regeneration in zone C without overheating of the catalyst to a heat damaging level; and (3) hydrocarbon conversion in zone A without the catalyst temperature dropping below the desired minimum reaction temperature.

In the system shown in Figure 1, the regions A, B, C and D may be continuously on the move around the reaction chamber or the movement may be intermittent with the regions advancing short distances at frequent intervals. In either case, the operation is such that at any instant the catalyst in the reaction zone A has been subjected without intervening regeneration to contact with hydrocarbon reactant for progressively decreasing periods of time in the direction of zone movement. This means that all of the oil charge at any time contacts both partially spent and substantially fresh catalyst. In other words, at all times regardless of the position of region A, all of the oil charge has been subjected to about the same severity of conversion so that constant yields and uniform product quality must result. It will be apparent that the synthetic crude stream leaving the chamber A will be at all times of about the same amount and kind so that the operation of the product recovery system is not complicated by the fluctuations characteristic of conventional fixed bed operations. At the same time, these advantages have been obtained without the necessity for moving the catalyst or the large chamber containing the catalyst.

Turning to Figures 2 and 3, which may best be read together, there is shown a system in which the solid material may be arranged in an endless column. In Figures 2 and 3, the solid contact material is confined in a chamber 20 which forms a closed circuit in which the catalyst column 21 is confined and through which gas may flow. The chamber shown has a rectangular vertical cross-sectional shape but may be of other shape if desired. The chamber has a continuous outside wall 22 and a continuous inside wall 23, leaving an opening 24 in the center. The chamber, of course, is provided with suitable heat insulation not shown. Baffles 80 and 81 are provided in the two horizontal legs of the chamber to prevent gas by-pass over the surface of the catalyst mass therein. Baffles 82 are provided at the corners to equalize the flow distance for gas around the corners. Other suitable baffling arrangements may be substituted for this purpose. Within chamber 20 there are provided at intervals all around the closed circuit horizontal rows of gas handling tubes which are indicated by letters E to P inclusive. These tubes extend horizontally across the chamber 20 and are provided at intervals along their lengths with orifices 26 which are smaller in size than the contact material particles so as to permit passage of only the fluid reactants. One such row of tubes is shown in Figure 3 from which it may be seen that the tubes in each row are manifolded together by headers 27 and 28 at their opposite ends. Header 27 is connected via conduit 29 to an oil inlet pipe 32, an air inlet pipe 30 and a steam inlet pipe 31. Pipes 32, 30 and 31 which are provided for each row of the tubes E—P in turn connect into oil, air and steam headers 33, 34 and 35 respectively. These latter headers are provided outside the chamber 20 and extend all around the vertical face of the vessel so as to provide three separate endless inlet manifolds. Manifold 33 is supplied continuously with oil charge from conduit 38; manifold 34 with oxygen containing gas charge from conduit 39 and manifold 35 with steam or flue gas from conduit 40. Each of pipes 32, 30 and 31 are provided with a set of two motor operated valves arranged to provide a block chamber into which steam may be supplied when the valves are closed. These valves are shown at 41—46 respectively and the steam inlet pipes are shown at 47—49. The pipes 47—49 are also provided with motor operated valves 50—52. All of these valves are operated in proper cycle by a timing instrument arrangement shown diagrammatically at 55. Suitable timing instrumentation which is adaptable for this type of control is well known to the art and needs no further description here. The header 28 provided for each row of tubes E—P is similarly connected via conduit 56 into oil, flue gas and steam outlet pipes 57, 58 and 59 respectively which in turn connect into oil flue gas and steam outlet manifolds 60, 61 and 62 respectively. These latter manifolds extend around the back side of chamber 20 in a manner similar to manifolds 33, 34 and 35. The manifold 60 connects into the single oil product withdrawal conduit 65 which connects into the product recovery system (not shown). Manifold 61 connects into flue gas outlet conduit 66 and manifold 62 connects into steam outlet conduit 67. Sets of motor operated valves 70—75 are provided on pipes 57—59 and these valves are operated by timing instrument 85 which is synchronized to operate with instrument 55. Steam inlet pipes 76—78 with valves thereon connect into the pipes 57—59 respectively between the motor operated valves.

In operation, the reaction and regeneration zones are caused to cyclically move around the column of contact material in chamber 20 by changing the locations of reactant inlet and outlet at frequent intervals in the proper manner. For example, at any given instant valves 41 and 42 on pipe 32 at tube level F may be opened so that oil charge enters the tubes F from conduit 38 and is distributed into the contact material column through orifices 26. Meantime, valves 43, 44, 45, 46 and 52 at that level are closed and steam valves 50 and 51 are opened so that air and steam does not enter the tubes F. The maintenance of a steam atmosphere between closed valves 43 and 44 and between valves 45 and 46 prevents entry of hydrocarbons into pipes 30 and 31. On the opposite ends of tubes F all the valves 70—75 are closed steam blankets and are maintained between the two closed valves on each of pipes 57, 58 and 59. The hydrocarbon charge passes up through the column in chamber 20 until it reaches tubes I through which it is withdrawn from the column. At the level of tubes I, all valves on pipes 29, 30 and 31 and on pipes 58 and 59 are closed and the blanket steam is admitted to these pipes between the closed valves. The valves 70 and 71 on outlet pipe 57 are open so that the vaporous hydrocarbon products may pass into manifold 60 and from there to the product recovery system via conduit 65. At the same instant that the conversion region exists between the tubes F and I, steam is admitted from conduit 40 to manifold 35 and then via pipe 31 into tubes K by which it is distributed into the column. This steam passes through the column to tubes J by which it is withdrawn. Valves on the manifolding at the ends of tubes K and J are controlled in a manner which is apparent from the above discussion so that only steam enters the tubes K and only steam with material purged from the contact material leaves the tubes J. The steam from this purge region is withdrawn via manifold 62 and conduit 67. Simultaneously, a region of regeneration gas flow is maintained between tubes O and L by proper control of the valves on the manifolds so that only air from conduit 38 and manifold 34 enter the tubes O and only flue gas leaves from the tubes L via manifold 61 and conduit 66. Likewise, steam is admitted from manifold 35 into tubes P and is withdrawn from tubes E into manifold 62 to complete the circuit. After the system has been in operation for a short period in the manner above described, say for 30 to 180 seconds, the valve settings on the manifolds are simultaneously changed by means of the timing instrument activating the motors driving the various valves so that now oil charge enters at tubes G and leaves at tubes J, steam enters at tubes L and leaves at K, air enters at tubes P and leaves at M and steam enters at tubes E and leaves at F. At this point oil vapors will pass through partially spent contact material between the levels of tubes G and H and through less spent material between tubes H and I and through fresh contact material between tubes I and J. This condition is normal and substantially the same at all times because in the manner above described the points of reactant inlet and outlet are caused to move cyclically all around the chamber 20 so that the regeneration region continuously follows the reaction region around the closed circuit. In order to prevent interflow of reactant vapors and air between the reaction and regeneration regions the pressure in these regions should be controlled at about the same level and the inert gas pressure in the two purge regions should be slightly above, say one-quarter to one pound per square inch that in the reaction and regeneration regions. This pressure control may be accomplished by the provision on the outlet manifolding of valves operated by differential pressure control instruments. Such an arrangement is shown and fully discussed hereinafter in connection with Figure 5.

If desired, in order to insure equal and uniform gas flow through the contact material paths for mass, the corners of the chamber 20 may be constructed as shown in Figure 4. In this arrangement screens or perforated partitions 83 and 84 are provided at both ends of all of vertical and horizontal legs of chamber 20 so as to exclude the contact material from the corner portions of the vessel. Similar elements in Figures 2 and 4 are indicated by identical numerals.

Turning now to Figure 5, there is shown an arrangement wherein the invention is applied to a single cylindrical reaction chamber 90. A conduit 91 connects together the upper and lower ends of chamber 90 so as to provide a closed circuit in which gas may flow. Perforated partitions 107 in the lower section of chamber 90 and perforated partition 108 in the upper portion of chamber 90 confine the contact material bed. A plurality of gas inlet pipes 95 having orifices 96 therein are provided at intervals along the chamber 90 and perforated outlet pipes 97 having orifices 98 therein are provided at alternate intervals along chamber 90. The pipes 95 and 97 are closed on one end, arranged in horizontal rows and connect on their open ends through pipes 110 and 111 respectively into headers 99 and 100 respectively. Each header 99 connects through pipe 115 and four-way valve 116 into a steam inlet pipe 117, oil inlet pipe 118 and air inlet pipe 119. The pipes 117, 118 and 119 connect into vertical headers 120, 121 and 122 which are in turn supplied by steam inlet conduit 123, oil inlet conduit 124 and air inlet conduit 125 respectively. Similarly, each row of outlet pipes 97 connect through four-way valves 125 into steam outlet pipe 126, oil outlet pipe 127 and flue gas outlet pipe 128. Pipes 126, 127 and 128 connect into vertical headers 129, 130 and 131 which in turn connect into steam outlet conduit 132, oil outlet conduit 133 and flue gas outlet conduit 134 respectively.

In operation, at a given instant hydrocarbon charge may be admitted at level Q—Q via tubes 95 and converted hydrocarbon products may be withdrawn at level R—R via tubes 97. Steam may be admitted at level S—S and withdrawn at level T—T. Air may be admitted at level Z—Z to pass downwardly through the bed and out the bottom of chamber 90 and then via conduit 91 to the top of chamber 90. The regeneration gas then passes down through the bed in the upper part of chamber 90 to be withdrawn at level U—U. Steam is admitted at level W—W and withdrawn at level X—X to complete the cycle. The reaction, regeneration and two purge zones are caused to move upwardly through chamber 90 and then around through conduit 90 into the bottom of chamber 90 by change in the points of gas inlet and outlet to and from the respective zones at frequent intervals. Thus, after the flow has continued in the manner described above for a short period, the oil inlet level would shift up to the next row of inlet tubes 95 and the oil outlet level would likewise shift up to the next row of outlet tubes 97. The other zones would similarly shift. This is accomplished by automatic manipulation of the motorized valves on inlet pipes 117, 118 and 119 and outlet pipes 126, 127 and 128 and the four-way valves 116 and 125 which are all caused to open and close at the proper time by timing controller 130. In order to avoid ambiguity the motors on the valves at only some of the manifold levels are shown to be wired to the controller 130, but it will be understood that the remaining valves are also similarly controlled by controller 130. The points of gas introduction to and withdrawal from the several regions may be caused to change frequently, for example, every 30–60 seconds so that there is provided in practical effect a substantially continuous region movement around the closed circuit. It is also contemplated that, if desired, the apparatus may be designed so that the points of gas inlet and outlet are continuously moving around the circuit, but for most operations an arrangement such as shown above is preferable from a construction standpoint. The outlet pressure from the reaction zone is maintained substantially constant by regulating valve 141 on conduit 133. The outlet pressure from the regeneration zone is maintained substantially equal to that from the reaction zone by diaphragm operated valve 142 on conduit 134 and differential pressure controller 143. The purge steam outlet pressure from both purge zones is maintained slightly above the hydrocarbon inlet pressure to the reaction zone by means of valve 144 which is regulated by differential pressure controller 145. It will be understood that the pressure control apparatus and hook up is shown in highly diagrammatic form to avoid ambiguity in the drawings. The details of hook up and arrangement of such differential pressure control apparatus will become apparent to those skilled in the art in light of the above discussion of the unit operation. It is generally desirable to maintain the direction of gas flow in the reaction and regeneration zones opposite because this simplifies the arrangement required to control the pressures in these zones substantially equal. However, the direction of zone movement is the same for all zones and in some operations the direction of gas flow may also be the same in all zones.

The arrangement shown in Figure 5 makes it possible to conduct a continuous cyclic hydrocarbon conversion and catalyst regeneration process in a single vertical chamber, without serious fluctuation in product yield or quality. This renders the process particularly well adapted for the purposes of small refiners because it eliminates the necessity of providing 6 to 8 large reaction vessels involving a high investment cost as is the case in current bed in place processes. However, it is contemplated as within the scope of this invention that two more vessels similar to that shown in Figure 5 may be connected together in series with the outlet end of the last vessel in series connected by a conduit to the inlet end of the first vessel in the series.

The particular operating conditions to be employed in the process of this invention are dependent upon a number of variables such as the nature of the petroleum charge stock, the nature of its conversion contemplated, and the nature of the solid contact material employed. These variables are of such nature as may be easily determined for specific applications by controlled experiments in existing equipment. Such experiments may be easily made by those skilled in the art. It is generally desirable to operate the reaction and regeneration zones at a low pressure, for example 0–15 pounds per square inch gauge, and purge zones are operated at one-half to 5 pounds per square inch higher pressure. In a typical operation involving the catalytic conversion of a virgin gas oil charge boiling in the range about 500° F.–950° F., over a synthetic silica-alumina gel type catalyst, at a reaction temperature in the range 800–950° F. and a regeneration temperature range of 800–1150° F., a suitable range of hydrocarbon charge space velocities are of the order of 3–6 volumes of oil charge (measured as a liquid) per volume of catalyst in the reaction region per hour and a suitable range of catalyst residence periods in the reaction zone are of the order of 30 seconds to 4 minutes. In such an operation the hydrocarbon charge may enter as a vapor at a temperature of the order of 800° F.–900° F. and the regeneration air may be supplied at a level which will thermally balance the operation. Flue gas may be cooled and recycled to the regeneration region in some operations. Under the above conditions, the heat required for the reaction is substantially all from the catalyst regeneration, the heat being stored up as sensible heat in the catalyst as the regeneration zone passes and being given up from the catalyst as the hydrocarbon conversion zone passes. Added flexibility may be provided by mixing into the catalyst mass predetermined amounts of inert heat carrying solids such as fused alumina, pieces of metal, deactivated catalyst, metal capsules containing fusible alloys, etc. By this procedure a heat balanced operation can be provided under almost any desired condition of hydrocarbon space velocity and catalyst residence time and the hydrocarbon charge may be introduced into the reaction region partially or entirely in the liquid phase.

It will be understood that the specific apparatus construction and arrangement details and the specific examples of operation given are intended as illustrative only and should in no way be construed as limiting the scope of this invention except as it may be limited by the following claims.

I claim:
1. A method for conversion of hydrocarbons comprising: maintaining an elongated compact stationary column of particle form contact mass material along at least a substantial portion of the length of a closed, continuous stationary confined circuit for gas flow, maintaining a zone of hydrocarbon flow under suitable conversion temperature conditions within a portion of the length of said column to effect conversion of said hydrocarbons to vaporous hydrocarbon products with resultant deposition of carbonaceous contaminant on said contact material, maintaining a zone of oxygen containing gas flow within a different portion of the length of said column spaced apart from said first portion by a section of said column, maintaining an inert gaseous atmosphere in said column between said portions to exclude interflow of gas therebetween, and effecting gradual movement of said zones of hydrocarbon and oxygen containing gas flow cyclically around said closed circuit without movement of said column, the zone of oxygen containing gas flow following said zone of hydrocarbon flow around said circuit, thereby effecting the removal by burning of the contaminant deposited during the hydrocarbon conversion, the movement of said zones being effected by movement of the locations of gas introduction and withdrawal cyclically around said circuit any increment of said movement being substantially shorter than the length of said region of hydrocarbon flow, whereby within the zone of hydrocarbon flow the contact material has at any instant been subjected to hydrocarbon flow for a progressively shorter period of time in the direction of zone movement.

2. A method for converting hydrocarbons to lower boiling products comprising: maintaining an elongated substantially compact stationary column of particle form contact material in a stationary confined, elongated zone, flowing a hydrocarbon charge through a region in said column in the direction of its length for a distance amounting to only a portion of the column length to effect conversion of said charge at suitable conversion temperature conditions to lower boiling products with resultant deposition of a carbonaceous contaminant on the contact material, the hydrocarbon charge flowing the full length of said region, simultaneously maintaining a region of oxygen containing gas flow through the contact material along a different portion of the column length spaced apart from said region of hydrocarbon flow, said regions being separated by a portion of said column through which gas might flow, maintaining flow of an inert purge gas through said contact material in the portions of the column between said regions of hydrocarbon and oxygen containing gas flow and under a pressure greater than that in said latter regions, effecting successive changes in the locations of gas supply to and withdrawal from said regions along said column so as to cause the region of hydrocarbon flow to move along the length of said stationary column in a single direction, whereby the hydrocarbon charge always flows through contact material which has been in the region of hydrocarbon flow for progressively shorter periods in the direction of the region movement along said column, similarly effecting movement of the simultaneously existing region of oxygen containing gas flow along said column after said region of hydrocarbon flow but spaced apart therefrom so as to effect burning of the contaminant from the contact material while maintaining a flow of inert gas in the portion of the column between said moving regions.

3. The method of claim 2 further characterized in the step of controlling the rate of movement along said column of said regions of hydrocarbon and oxygen containing gas flow to maintain in approximate balance the excess heat absorbed in said region of hydrocarbon flow and the excess heat liberated in said region of oxygen containing gas flow.

4. A method for catalytic cracking of high boiling hydrocarbons to lower boiling products comprising: maintaining a fixed, substantially compact bed of particle form catalyst in a single confined, elongated, stationary zone, maintaining a region of hydrocarbon flow lengthwise through said bed along a portion of its length, said region being continuously supplied by high boiling hydrocarbon charge and being continuously relieved of gasiform conversion products, simultaneously maintaining a region of regeneration gas flow through a different portion of said bed spaced along its length from said first named region, maintaining a region of substantially inert gas flow between said regions of hydrocarbon and regeneration gas flow, effecting a cyclic movement of said region of hydrocarbon flow, followed by said region of inert gas flow and by said region of regeneration gas flow along the length of said bed until one end of said zone is reached and then back through a confined passage into the opposite end of said zone, said cyclic movement being effected by causing the locations of gas introduction to and withdrawal from said regions to be changed along said zone in such a manner that at any instant the catalyst in the portion of the bed in which the region of hydrocarbon flow then exists has been subjected continuously to hydrocarbon flow for progressively shorter periods in the direction of region movement and the catalyst in the portion of the bed in which regeneration gas flow then exists has been subjected continuously to regeneration gas flow for progressively shorter periods in the direction of the region movement.

5. A method for conversion of hydrocarbon charges to lower boiling products comprising: maintaining a substantially compact fixed mass of particle form catalyst along at least a substantial portion of the length of a closed, stationary confined circuit, maintaining a region of hydrocarbon flow through said catalyst mass along a portion of the length of said circuit to effect at suitable temperature conditions hydrocarbon conversion to gasiform products with resultant deposit of contaminant on the catalyst, said flow running in the direction of the circuit length and being supplied by said hydrocarbon charge, withdrawing converted hydrocarbon in gaseous form from said region, similarly maintaining a region of regeneration gas flow through the mass of catalyst along a different portion of the length of said circuit, maintaining regions of inert gaseous material flow through the catalyst mass in the portion of the circuit between said regions of hydrocarbon and regeneration gas flow and maintaining the pressure in said regions of inert gas flow above that in said regions of hydrocarbon and regeneration gas flow, withdrawing inert gas containing material purged from said catalyst from said regions of gas flow, effecting cyclic movement of all of said regions in proper order around said circuit by cyclic movement around said zone of the locations of gas introduction to and withdrawal from said regions, thereby effecting the continuous conversion of said hydrocarbon charge to substantially uniform products and the removal by burning of the contaminant deposited on the catalyst, the catalyst in the regions of hydrocarbon and regeneration gas flow at any given instant having been continuously subjected to gas of that respective type for progressively shorter periods in the direction of region movement, and controlling the rate of region cyclic movement to maintain in approximate balance the excess heat absorbed in the region of hydrocarbon flow and the excess heat released in the region of regeneration gas flow.

6. A method for conversion of hydrocarbons comprising: maintaining an elongated substantially compact stationary column of particle form contact material in a confined, elongated zone, maintaining a reaction zone of hydrocarbon material flow within a portion of the length of said column under suitable conditions to effect the desired conversion of the hydrocarbon material with resultant deposition of carbonaceous contaminant on said contact material, maintaining a zone of oxygen containing gas flow within a different portion of the length of said column spaced apart from said first portion under conditions suitable for effecting combustion of said carbonaceous contaminant, maintaining an inert gaseous atmosphere in said column between said portions to exclude commingling of the hydrocarbon material and oxygen containing gas, effecting movement of said zones of hydrocarbon and oxygen containing gas flow along the length of said stationary column while maintaining the inert gaseous atmosphere in the portion of the column between the moving zones, the zone movement along said column being effected in the gradual manner, whereby the contact material in the zone of hydrocarbon material flow at any given instant has been subjected to hydrocarbon flow for progressively shorter periods of time in the direction of zone movement along said column.

7. A method for conversion of hydrocarbons comprising, maintaining an elongated substantially compact stationary column of particle form contact material in a stationary confined, elongated zone, flowing a hydrocarbon charge through a region in said column in the direction of its length for a distance amounting to only a portion of the column length under suitable conditions to effect the desired conversion of the hydrocarbon charge to gaseous products with resultant deposition of a carbonaceous contaminant on the contact material, simultaneously maintaining a region of oxygen containing gas flow within a different portion of the column length spaced apart from said first portion under suitable conditions to effect removal of the carbonaceous contaminant from the contact material by combustion, the column being open to gas flow between said portions for hydrocarbon and oxygen containing gas flow and excluding interflow of gas between said portions by maintaining an inert gaseous atmosphere in said column between said portions, effecting movement of said region of hydrocarbon and oxygen containing gas flow along the length of said column while maintaining the inert gaseous atmosphere in the portion of the column between the moving regions, said movement being effected by changing the locations of gas introduction and withdrawl for said regions in such manner as to provide within the region of hydrocarbon flow at any given instant contact material which has been subjected without intervening oxygen gas flow to hydrocarbon flow for progressively shorter periods of time in the direction of region movement.

8. A method for catalytic conversion of hydrocarbon charges to lower boiling products comprising: maintaining a substantially compact fixed mass of particle form catalyst along at least a substantial portion of the length of a closed, confined circuit, maintaining a region of hydrocarbon flow through said catalyst mass along a portion of the length of said circuit to effect at suitable temperature conditions hydrocarbon conversion to gasiform products with resultant deposit of contaminant on the catalyst, said flow running in the direction of the circuit length and being supplied by said hydrocarbon charge, withdrawing converted hydrocarbon in gaseous form from said region, similarly maintaining a region of regeneration gas flow through the mass of catalyst along a different portion of the length of said circuit, the circuit being open to flow of gas between said regions but such interflow of gas being prevented by maintaining regions of inert gaseous material flow through the catalyst mass in the portion of the circuit between said regions of hydrocarbon and regeneration gas flow, withdrawing inert gas containing material purged from said catalyst from said regions of gas flow, effecting cyclic movement of all of said regions in proper order around said circuit by cyclic movement around said circuit of the locations of gas introduction to and withdrawal from said regions, thereby effecting the continuous conversion of said hydrocarbon charge to substantially uniform products and the removal by burning of the contaminant deposited on the catalyst, any instantaneous increment of said movement being substantially shorter than the length of said region of hydrocarbon flow, whereby the contact material within the region of hydrocarbon flow at any given instant has been subjected uninterruptedly to hydrocarbon flow for progressively shorter periods of time in the direction of region movement.

9. A method for conversion of hydrocarbons comprising: maintaining an elongated compact stationary column of particle form contact mass material along at least a substantial portion of the length of a closed, continuous confined circuit for gas flow, flowing a hydrocarbon charge through a region in said column in the direction of its length for a distance amounting to only a portion of the column length under suitable conditions to effect the desired conversion of the hydrocarbon material with resultant deposition of a carbonaceous contaminant on the contact material, the hydrocarbon charge flowing the full length of said region, maintaining a region of oxygen containing gas flow through the contact material along a different portion of the column length spaced apart from said region of hydrocarbon flow, under suitable conditions to effect burning of said carbonaceous contaminant, the sections of said circuit between said regions of hydrocarbon and oxygen containing gas flow being in open communication with said regions, maintaining an inert gaseous atmosphere in said sections of said circuit between said regions of hydrocarbon and oxygen containing gas flow to exclude interflow of gas therebetween and effecting cyclic movement of all of said regions for flow around said continuous circuit by changing the locations of gas introduction and withdrawal for the respective regions so that they in effect move cyclically around said circuit in such manner that the hydrocarbon charge always flows through contact material which has been in the region for hydrocarbon flow for progressively shorter periods in the direction of region movement along said column.

10. The method of claim 8 further characterized in that the hydrocarbon charge flows through said column in the direction of region movement around said circuit.

JOHN A. CROWLEY, Jr.

References Cited in the file of this patent

UNITED STATES PATENTS

| Number | Name | Date |
|---|---|---|
| 2,334,555 | Howard | Nov. 16, 1943 |
| 2,355,024 | Yerrick et al. | Aug. 1, 1944 |